F. J. MACKLIN & F. W. TRIMMER.
SEALING DEVICE.
APPLICATION FILED DEC. 8, 1910.

1,057,438.

Patented Apr. 1, 1913.

Witnesses:
R. Y. Stevenson
H. Schneider

Inventors
Frank J. Macklin
Frank W. Trimmer
By Geo. W. Rightmire
Attorney

UNITED STATES PATENT OFFICE.

FRANK J. MACKLIN AND FRANK W. TRIMMER, OF COLUMBUS, OHIO, ASSIGNORS TO THE UNITED SEAL COMPANY, OF COLUMBUS, OHIO, A CORPORATION OF OHIO.

SEALING DEVICE.

1,057,438. Specification of Letters Patent. Patented Apr. 1, 1913.

Application filed December 3, 1910. Serial No. 596,272.

*To all whom it may concern:*

Be it known that we, FRANK J. MACKLIN and FRANK W. TRIMMER, citizens of the United States, residing at Columbus, in the county of Franklin and State of Ohio, have invented certain new and useful Improvements in Sealing Devices, of which the following is a specification.

The invention relates to improvements in sealing devices, particularly adapted to electric meters, but not confined thereto.

The device is adapted to be positioned upon lugs or extensions, one formed on each section or portion of the cover of the casing of the meter, and frangibly locked thereon, whereby the portions of the meter covering or casing are held against unwarranted separation.

Figure 1:
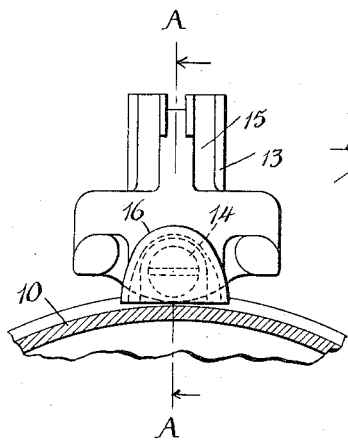
Figure 2:
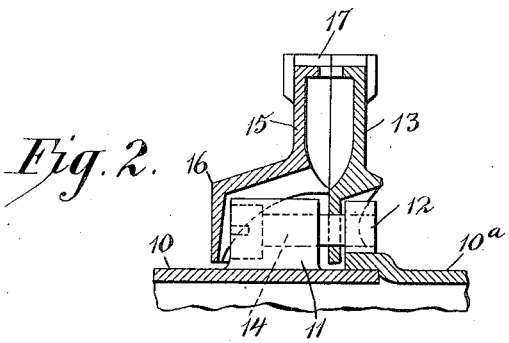

The details of construction will be set forth hereinafter, and in the drawings hereto attached and hereby made a part of this application, Figure 1 is a top view of the sealing device in place on the meter casing; Fig. 2 is a section through Fig. 1 along the line A—A with the seal fitted thereto.

Essentially two members are required, one applied to the meter, and a second member applied to the first and secured thereon by an appropriate key or seal member applied to lock the two other members together and to the meter.

In the drawings are shown conventionally a portion of a meter cover or casing formed of two parts, circular in outline and overlapping so as to inclose a meter snugly in a manner well understood and which is not therefore illustrated, the important matter herein being the construction for providing for the locking or sealing features.

The portions of the casing, broken away, are shown at 10 and 10ª, the latter overlapping the former; on the part 10 is formed the lug 11 having the opening therethrough, and on the part 10ª is formed the lug 12 having a corresponding opening therethrough. These lugs are preferably in proximity, and on the latter is positioned the member 13 of the sealing device; the screw 14 is inserted through the opening in lug 11, through the opening in the member 13 and the opening in the lower lug 12, and by this means the member 13 is secured on the meter casing. The member 15 is then positioned on member 13, and the hood or extension 16 overlies head of the screw 14 and covers the same and prevents access thereto while the said sealing members are in place. The cap or key member 17 is thereupon applied to the sealing members 13 and 15 to lock them together and at the same time secure them in place on the meter casing; the said key member is frangible and must be broken before the seal members can be removed and the meter entered.

The invention therefore includes the lugs with the engaging screw passing through said lugs and thereby securing the parts of the meter cover or casing together; the sealing member secured to one of said lugs by said screw, a second sealing member mounted on said first sealing member and secured thereto and covering said screw and preventing access thereto so long as the cap or key remains in place on said sealing members.

Only a slight quantity of material is needed to make the device, the weight is light, the cost is slight, the device is readily applied to a meter, and the sealing is effective.

What we claim is:—

In a meter having engaging cover parts, a lug on each of said parts, having an opening therethrough, a sealing member mounted upon one of said lugs having an opening therethrough, a screw passing through said lugs and said sealing member and thereby securing said cover parts together and securing said sealing member in position upon one of said lugs, a second sealing member applied to said first sealing member to inclose said screw head, and a cap or key member applied to the free ends of said sealing members to lock said sealing members together and to said meter cover parts.

In testimony whereof we affix our signatures in the presence of two witnesses.

FRANK J. MACKLIN.
FRANK W. TRIMMER.

Witnesses:
ALLEYNE CAMPBELL,
MAE DRUMM.

---

Copies of this patent may be obtained for five cents each, by addressing the "Commissioner of Patents, Washington, D. C."